(12) United States Patent
Wolfson et al.

(10) Patent No.: US 8,756,650 B2
(45) Date of Patent: Jun. 17, 2014

(54) DYNAMIC AUTHENTICATION OF A USER

(75) Inventors: Bruce Wolfson, Livermore, CA (US);
Walter Hurwitz, San Jose, CA (US);
Michael (Hongbin) Ji, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 421 days.

(21) Appl. No.: 12/829,317

(22) Filed: Jul. 1, 2010

(65) Prior Publication Data

US 2011/0225625 A1    Sep. 15, 2011

Related U.S. Application Data

(60) Provisional application No. 61/314,091, filed on Mar. 15, 2010.

(51) Int. Cl.
*H04L 29/06*    (2006.01)

(52) U.S. Cl.
USPC ............................................................ 726/1

(58) Field of Classification Search
USPC ............................................................ 726/1
See application file for complete search history.

(56) References Cited

U.S. PATENT DOCUMENTS

| | | | | |
|---|---|---|---|---|
| 6,092,198 | A * | 7/2000 | Lanzy et al. | 726/5 |
| 7,260,724 | B1 * | 8/2007 | Dickinson et al. | 713/182 |
| 7,647,622 | B1 * | 1/2010 | Sobel et al. | 726/1 |
| 2004/0049684 | A1 * | 3/2004 | Nomura et al. | 713/182 |
| 2004/0210771 | A1 * | 10/2004 | Wood et al. | 713/201 |
| 2005/0097320 | A1 * | 5/2005 | Golan et al. | 713/166 |
| 2005/0102244 | A1 * | 5/2005 | Dickinson et al. | 705/74 |
| 2005/0177724 | A1 * | 8/2005 | Ali et al. | 713/168 |
| 2006/0272011 | A1 * | 11/2006 | Ide et al. | 726/5 |
| 2007/0143832 | A1 * | 6/2007 | Perrella et al. | 726/5 |
| 2008/0033740 | A1 * | 2/2008 | Cahn et al. | 705/1 |
| 2008/0047017 | A1 * | 2/2008 | Renaud | 726/25 |
| 2008/0066165 | A1 * | 3/2008 | Rosenoer | 726/5 |
| 2008/0086759 | A1 * | 4/2008 | Colson | 726/2 |
| 2009/0030756 | A1 * | 1/2009 | Riley et al. | 705/7 |

(Continued)

OTHER PUBLICATIONS

Broadcom's New Family of Secure Applications Processors Holds the Key to Preventing Data Theft and Identity Fraud, http://www.broadcom.com/press/release.php?id=1233473 Retrieved on Jul. 1, 2010, (2008), 2 pages.

(Continued)

*Primary Examiner* — Michael S McNally
(74) *Attorney, Agent, or Firm* — McDermott Will & Emery LLP (57) ABSTRACT

According to an example embodiment, a system may include at least one processor and at least one memory comprising a policy module configured to receive data indicating risk factors associated with users of the system; update risk levels for the users by applying the data to risk factor rules; and provide the updated risk levels and/or authentication levels associated with the updated risk levels to an authentication module in response to receiving requests from the authentication module. The at least one processor and at least one memory may also comprise the authentication module configured to receive a first access request from a user; in response to receiving the first access request, request a first updated risk and/or authentication level for the user from the policy module; and require the user to provide a first authentication technique to grant the first access request based on the first updated risk and/or authentication level received from the policy module.

16 Claims, 6 Drawing Sheets

(56) References Cited

U.S. PATENT DOCUMENTS

| | | | |
|---|---|---|---|
| 2009/0077383 A1* | 3/2009 | de Monseignat et al. | 713/175 |
| 2009/0199264 A1* | 8/2009 | Lang | 726/1 |
| 2009/0292927 A1* | 11/2009 | Wenzel et al. | 713/185 |

OTHER PUBLICATIONS

Mimura, Masahiro et al., "Fingerprint Verification System on Smart Card", WPM P-1.03 Retrieved on Mar. 9, 2010, pp. 182-183.

Thanh, Do V., et al., "Strong authentication with mobile phone as security token", IEEE 6th International Conference on Mobile Adhoc and Sensor Systems, MASS '09., (2009.), pp. 777-782.

Doyle, Paul et al., "Ubiquitous Desktops with Multi-factor Authentication", Third International Conference on Digital Information Management, ICDIM 2008., (2008.), pp. 198-203.

"naviGO™", Assa Abloy, (2009), 4 pages.

"Introduction to the Windows Biometric Framework (WBF)", (2008), 12 pages.

* cited by examiner

DYNAMIC AUTHENTICATION OF A USER

CROSS-REFERENCE TO RELATED APPLICATION

This application claims priority under 35 U.S.C. §119 to U.S. Provisional Patent App. No. 61/314,091, filed Mar. 15, 2010, titled "ADAPTIVE AND DYNAMIC MULTI-FACTOR AUTHENTICATION WITH SYSTEM-ON-A-CHIP," which is incorporated herein by reference in its entirety.

TECHNICAL FIELD

This description relates to computer security and authentication.

BACKGROUND

Users often log onto computers, networks, and websites. In so doing, users may be asked to authenticate their identity, e.g., by providing a username and password, or by other known authentication techniques. However, risk factors related to authenticating users may change over time, and a static authentication policy is insufficient to maintain a desired level of security under changing conditions.

SUMMARY

The details of one or more implementations are set forth in the accompanying drawings and the description below. Other features will be apparent from the description and drawings, and from the claims.

DETAILED DESCRIPTION

Figure 1:
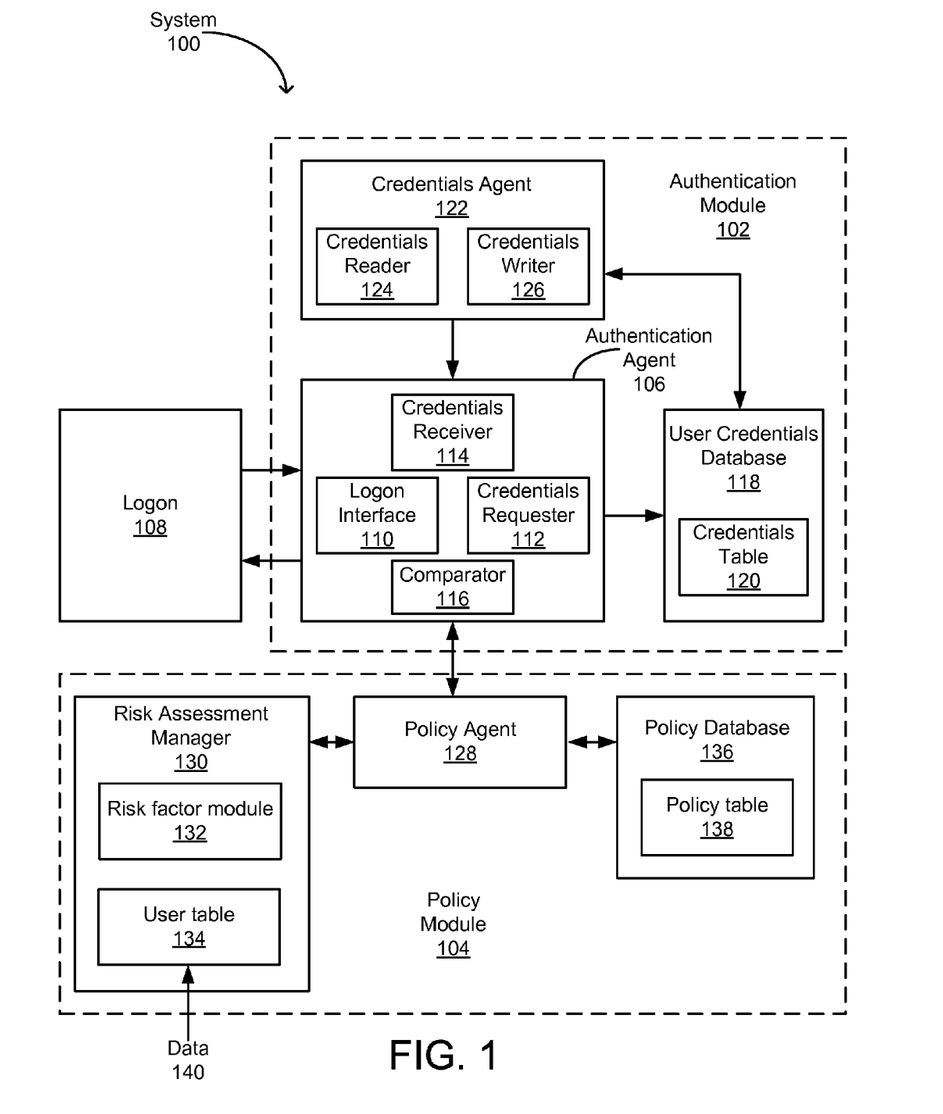
FIG. 1 is a block diagram of a system for dynamically authenticating a user according to an example embodiment.

FIG. 1 is a block diagram of a system 100 for dynamically authenticating a user according to an example embodiment. The system 100 may be embodied on an integrated circuit (IC), on a system on a chip (SoC), in software installed on at least one processor and at least one memory, on a server, personal computer, notebook computer or other computing device, or on multiple computers, according to various example embodiments. In an example in which the system 100 is embodied on an IC or SoC, the IC or SoC may be separate from a host CPU, increasing security by acting as a hardware-based gatekeeper to other computing devices.

The system 100 may be used for authentication and/or authorization of users. The system 100 may, for example, allow a user to logon to the system 100 and use resources of the system 100 and/or resources of computing devices in communication with the system 100. The system 100 may be integrated with readers and/or input devices, such as by coupling to a keyboard, fingerprint scanner, iris reader, smartcard reader, or contactless card reader, and/or may be configured to generate hardware tokens such as one-time-passwords (OTPs).

The system 100 may authenticate users to ensure their identity and ensure secure access to resources of the system 100 and/or computing devices in communication with the system 100. The system 100 may, for example, require a user to perform authentication techniques. The authentication techniques may each be independently sufficient to authenticate the user, based on a determined risk level associated with the user and/or the system 100. Requiring more than one authentication technique increases the security level of the system 100.

The system 100 may determine the risk level based on, for example, receiving data 140 that indicate risk factors, and/or time-varying context factors. The risk factors and/or time-varying context factors may change over time, resulting in different or updated risk levels for the same user at different times. The system 100 may receive data 140 indicating the risk factors and/or time-varying context factors from modules within the system 100 (which are not shown in FIG. 1), or from modules or computing devices outside the system 100. The data 140 indicating risk factors, and/or time-varying context factors may include previous activity associated with the user, such as failed logon attempts or a pattern of financial activity, or may include information associated with the system 100, such as network or security attacks on the system 100. The system 100 may change the authentication level based on the updated risk level, and may require a greater number of, and/or more secure, authentication techniques based on the updated risk level.

The authentication techniques may include asking the user for information that he or she knows (denoted $A_0$ in an example embodiment), such as, for example, passwords, personal identification numbers (PINs), pass phrases, or other information known to the user. Authentication techniques may also be based on an object or device, such as an electronic security device, that the user has (denoted $A_1$ in an example embodiment), or information presented to the user or to the system 100 by the electronic security device, such as one-time programmable (OTP) tokens, smart cards, radio frequency identification (RFID) cards, or mobile phones. Authentication techniques may also be based on biometric information (denoted $A_2$ in an example embodiment), such as fingerprints, facial identification features, or the iris of the user's eye. Authentication techniques may also be based on information or knowledge about the user (denoted $A_3$ in an example embodiment), which may not be known to the user, such as an address such as a medium access control (MAC) address or Internet Protocol (IP) address of the computer used to logon, or recent history of the user's activity in the system 100 and/or computing devices in communication with the system 100. Any or all of these authentication techniques or factors may be stored in, or calculated by, the computing system 100. A summary of these authentication techniques or factors according to an example embodiment is shown below:

TABLE 1

Definitions of Multi-Factors and Examples

| Authentication Factors | Description | Examples |
|---|---|---|
| $A_0$ | What he knows | Password, PIN, pass phrase |
| $A_1$ | What he has | Electronic security device |

TABLE 1-continued

Definitions of Multi-Factors and Examples

| Authentication Factors | Description | Examples |
|---|---|---|
| | | such as OTP tokens, smart card, RFID card, mobile phone |
| $A_2$ | Who he is | Biometric information such as fingerprint, facial features, iris |
| $A_3$ | Special knowledge about him | MAC address of computer owned or used, recent history of activity |

The system 100 may require the user to present more (and/or different ones) of these authentication techniques to logon when the system 100 determines a greater risk level, and/or when granting the logon request will include allowing the user to access more sensitive data, and may allow the user to present fewer of these techniques, such as a single one of the techniques, when the system 100 determines a lower risk level. Requiring fewer authentication techniques may be more convenient for the user, whereas requiring more techniques may increase security in the system 100. The system 100 may dynamically change the number and type of required logon techniques based on factors such as the present risk level.

The system 100 may dynamically change the required authentication factors based on, for example, a risk to the system 100 and/or a network in which the system 100 is included. The system 100 may change the risk level and/or the required authentication factor based on risk levels associated with a context of the logon request, which may be associated with the system 100 and/or the user, such as based on previous failed logon attempts by the user or other users, patterns of financial activity by the user, security attacks on the network which includes the system 100, or a location from which the user requests to logon, as non-limiting examples.

The system 100 may change the authentication factor based on the determined risk level. For example, instead of merely requiring information that the user knows, such as passwords, personal identification numbers (PINs), or pass phrases, the system 100 may require an additional authentication factor(s) such as information included in an electronic device, or biometric information, based on the determined risk level.

The system 100 may include multiple components for receiving the logon request, determining the risk level, determining the required authentication techniques based on the risk level, requiring the user to present the required authentication techniques, and determining whether the user properly presented the authentication techniques. The system 100 may include an authentication module 102 and a policy module 104. The authentication module 102 may receive logon requests from a user. In response to receiving a logon request, the authentication module 102 may request the risk and/or authentication level for the user from the policy module 104. Based on the risk and/or authentication level received from the policy module 104, the authentication module 102 may require the user to present one or more authentication techniques to logon. The authentication module 102 may compare the user's input of the authentication technique to stored credentials associated with the user, and if the user's input matches the stored credentials, the authentication module 102 may grant the logon request, according to an example embodiment.

In the example embodiment shown in FIG. 1, the authentication module 102 may include an authentication agent 106. The authentication agent 106 may include software embodied on a computer, or may be embodied on an IC or SoC. The authentication agent 106 may determine and/or require authentication techniques or factors for the user, and compare authentication techniques or factors input by the user in response to the required authentication factors. The authentication agent 106 may include a logon interface 110 which receives logon requests from the user via a logon station 108. The logon station 108 may include, for example, a computer via which the user logs onto the system 100, a keyboard coupled to the system 100, or other devices via which a user may log onto and/or provide input to the system 100. The logon station 108 may also be integrated with readers and/or input devices, such as a fingerprint scanner, iris reader, smartcard reader, and/or contactless card reader. The logon station 108 may be part of the system 100 and/or component of the system 100, or may be a separate computing or input device coupled to the system 100 via a network or various communication and/or networking technologies. The logon request may include an identification of the user, such as the user name or ID, and/or may include information related to a location of the user, such as an Internet Protocol (IP) or Medium Access Control (MAC) address, or may include only an indication that an unknown user desires to logon, after which the system 100 may request the identity of the user, according to example embodiments.

The authentication agent 106 may respond to the logon request from the user via the logon station 108 by asking for a login name if the logon name was not included in the logon request. In some embodiments, the logon request may include both the username and password, after which the system 100 may determine whether to require the user to present additional authentication techniques or factors, whereas in other embodiments the system 100 may determine which authentication techniques or factors to require after determining the username of the user requesting to logon. Or, in an example in which the logon request does not include even the username (or other identification of the user), the system 100 may determine which authentication techniques or factors to require after either receiving the username and based on a risk level associated with the user, or before receiving the user name and based on a risk associated with the system 100.

The authentication agent 106 may request an authentication level and/or required authentication techniques for the user from the policy module 104. The request from the authentication agent 106 to the policy module 104 may include an identification of the user. The authentication techniques that the authentication agent 106 receives from the policy module 104 may specify the types of authentication techniques to require from the user, such as information that the user knows (password, PIN, passphrase), an electronic security device (OTP token, smart card, RFID card, mobile phone), biometric information (fingerprint, facial recognition, iris scan), or address information (such as a MAC or IP address of the computer used to logon), but may not specify the content to be presented, such as the actual password to be entered.

Based on the determined risk level and/or authentication technique(s) or factor(s), which may be based on the user and/or the system 100, the authentication agent 106 may require the user to present the required authentication techniques or factors, such as information the user knows, such as a password, information stored on electronic devices, biometric information, or knowledge of a location and/or computer that the user is logging in from. In some examples, the risk level and/or authentication technique(s) or factor(s) may be based on the knowledge of the computer or location that the user is logging in from.

After determining the required authentication techniques or factors, the authentication agent 106 may present the required authentication techniques or factors, as well as the identity of the user, to a user credentials database 118. The authentication agent 106 may provide the type of authentication techniques or factors to the user credentials database 118, but not the actual authentication information received from the user, so that the authentication agent 106 may receive the authentication information which will be compared to the information received from the user to determine whether to authenticate the user.

The authentication agent 106 may include a credentials requester 112 module which requests credentials (or the content of the required authentication technique), such as the actual password to be used, the information which should be provided by the electronic security device, the biometric information associated with the user, or the address of the computer, from a user credentials database 118. A credentials receiver 114 of the authentication agent 106 may receive the credentials. After the user performs the required authentication technique(s), a comparator 116 of the authentication agent 106 may compare the information provided via the inputted authentication technique(s) or factor(s) to the received credentials, and grant or deny logon requests by the user.

The user credentials database 118 may include the credentials and/or authentication information which will be required for the user to logon. The user credentials database 118 may include the credentials and/or authentication information in a credentials table 120. The credentials table 120 may, for example, for each potential user, include passwords, PINs, pass phrases, information which should be stored on (and/or provided by) an electronic device possessed by the user, biometric information about the user, and/or information about computer via which the user may log onto the system 100. The user credentials database 118 may provide the authentication information and/or authentication techniques or factors to a credentials agent 122 based on the risk level and/or required authentication level for the user. In an example embodiment, the higher the risk level and/or the higher the authentication level, the more authentication techniques or factors will be required for the user to logon; thus, for a higher risk level or authentication factor, the user credentials database 118 will provide more authentication factors or authentication information to the credentials agent 122.

The user credentials database 118 may have stored the information about the user based on information provided by the credentials agent 122. The credentials agent 122 may include a credentials reader 124 which reads credentials and/or authentication information from the user credentials database 118. The credentials agent 122 may also include a credentials writer 126 which writes credentials and/or authentication information to the user credentials database 118. The credentials reader 124 of the credentials agent 122 may receive the authentication information and/or authentication technique(s) or factor(s) from the user credentials database 118, and may provide the authentication information and/or authentication technique(s) or factor(s) to the authentication agent 106.

The authentication agent 106 may, in response to receiving the logon request from the user via the logon station 108 and the authentication information or authentication technique(s) or factor(s) from the credentials agent 122, require the user to present the authentication technique(s) or factor(s) to logon.

The authentication agent 106 may receive the authentication information or authentication technique(s) or factor(s) from the credentials agent 122 before, after, or simultaneously with, receiving the authentication technique(s) or factor(s) from the user.

The authentication agent 106 may require different numbers and/or different types of authentication factors from the user at different logon attempts based on the determined risk level and/or determined authentication level associated with the user and/or the system 100. For example, in a first logon attempt or logon request by a given user, the authentication agent 106 may require only a first authentication technique or factor, but during a second logon request by the same user in which the system 100 has determined that the risk level and/or required authentication level is higher, the authentication agent 106 may require a first authentication technique or factor, a second authentication technique or factor, and, in some instances, even a third authentication technique or factor and/or a fourth authentication technique or factor.

While the user credentials database 118 and credentials agent 122 of the authentication module 102 provide the authentication information to the authentication agent 106 to compare to the information provided by the user for a given risk and/or authentication level, the system 100 may include other components or modules which determine a risk level and/or required authentication level based on a context of the system 100 and/or based on the identity of the user requesting to logon. The components or modules which determine a risk level and/or required authentication level based on a context of the system 100 and/or based on the identity of the user requesting to logon may collectively be referred to as a policy module 104. In the example shown in FIG. 1, the policy module 104 may include a policy agent 128 coupled to and/or in communication with the authentication agent 106. The policy module 104 may determine and/or change the required level of authentication for the user and/or multiple users who attempt to log onto the system 100.

In an example embodiment, the policy agent 128 may be coupled to a risk assessment manager 130 and a policy database 136. The risk assessment manager 130 may determine a risk level for the system 100 and/or a risk level for a particular user. The risk assessment manager 130 may determine the risk level based, for example, on failed logon attempts by the user, a pattern of financial activity by the user, a location from which the user requested the logon, and/or previous attacks on the system 100 or on a network of which the system 100 is a member. For example, if the user requests to logon from a location considered dangerous, such as a country or physical locale which has been known to make security attacks on networks in general or on the network which includes the system 100, then the risk assessment manger 130 may increase the risk level for the user or for all users attempting to logon to the system 100. Or, if the user requests to logon from a corporate campus or network, the risk assessment manager 130 may determine that the risk is lower than if the user requests to logon from home, and/or the risk assessment manager 130 may determine that the risk is lower if the user requests to logon from a corporate laptop computer than if the user requests to logon from an unknown computer. The policy risk assessment manager 130 may determine the risk at any time, such as at pre-boot authentication (PBA), or in response to operating system (OS) requests, such as in response to requests from a Windows® OS request.

In the example shown in FIG. 1, the risk assessment manager 130 may include a risk factor module 132 and a user table 134. The user table 134 may store identities of prospective users of the system 100, and, for each prospective user, may store data indicating risk factors and/or time-varying context factors, as well as their most recently determined risk level. The user table 134 may receive real-time and/or updated data indicating risk factors and/or time-varying context factors, and update the data associated with each user. In response to either receiving a risk level request from the policy agent 128, or receiving the data, the user table 134 may, for each user, provide the data to the risk factor module 132. The risk factor module 132 may include rules for determining a risk factor for a user based on the data indicating risk factors and/or time-varying context factors. The risk factor module 132 may, using the rules, combine or perform a function on the data indicating risk factors and/or time-varying context factors to determine a most recent or updated risk level. The risk factor module 132 may provide the updated or most recent risk level for an identified user to the user table 134. The user table 134 may store the updated or most recent risk level for the identified user. The user table 134 may provide the updated or most recent risk level for an identified user to the policy agent 128 upon request from the policy agent 128.

The policy agent 128 may, in response to receiving a risk level request from the authentication agent 106, request a risk level for the user from the risk assessment manager 130. The risk factor module 132 may determine the risk level based on factors described above, and provide the determined the risk level to the user table 134, and the user table 134 may provide the updated or most recent risk level for the user to the policy agent 128.

The policy agent 128 may provide the received risk level to the policy database 136. The policy database 136 may include a policy table 138. The policy table 138 may associate, include, and/or store user IDs or groups and/or risk levels with authentication levels, techniques, factors, or credentials. The policy database 136 may check the risk level against the policy table 136 and return a required authentication level to the policy agent 128. For example, the policy database may determine that if a user is at risk level one, the user need only provide a first authentication technique or factor such as a password, but if the user is at risk level two, the user must also provide a password and a number read from an OTP token, and if the user is at risk level three, the user must provide a password, a number from an OTP token, and biometric information such as a fingerprint. The following example policy table 138 shows an example of required authentication techniques or factors for user groups based on risk levels:

TABLE 2

Example of User Groups and Credentials

| User Groups | Risk Level | Registered Credentials |
|---|---|---|
| G0 | 1 | $A_0$ |
| G1 | 2 | $A_0 A_1$ |
| G2 | 3 | $A_0 A_1 A_2$ |
| G3 | 4 | $A_0 A_1 A_2 A_3$ |

The policy agent 128 may receive the required authentication level, technique(s), or factor(s) from the policy database 136. The policy agent 128 may provide the required authentication level, technique(s), or factor(s) to the authentication agent 106. The authentication agent 106 may provide the required authentication level, factor(s), or technique(s), and the identity of the user, to the user credentials database 118 which may, along with the credentials agent 122, provide the required authentication information and/or authentication factor to the authentication agent 106 which the authentication agent 106 will require from, and compare to, information provided by the user.

Figure 2:
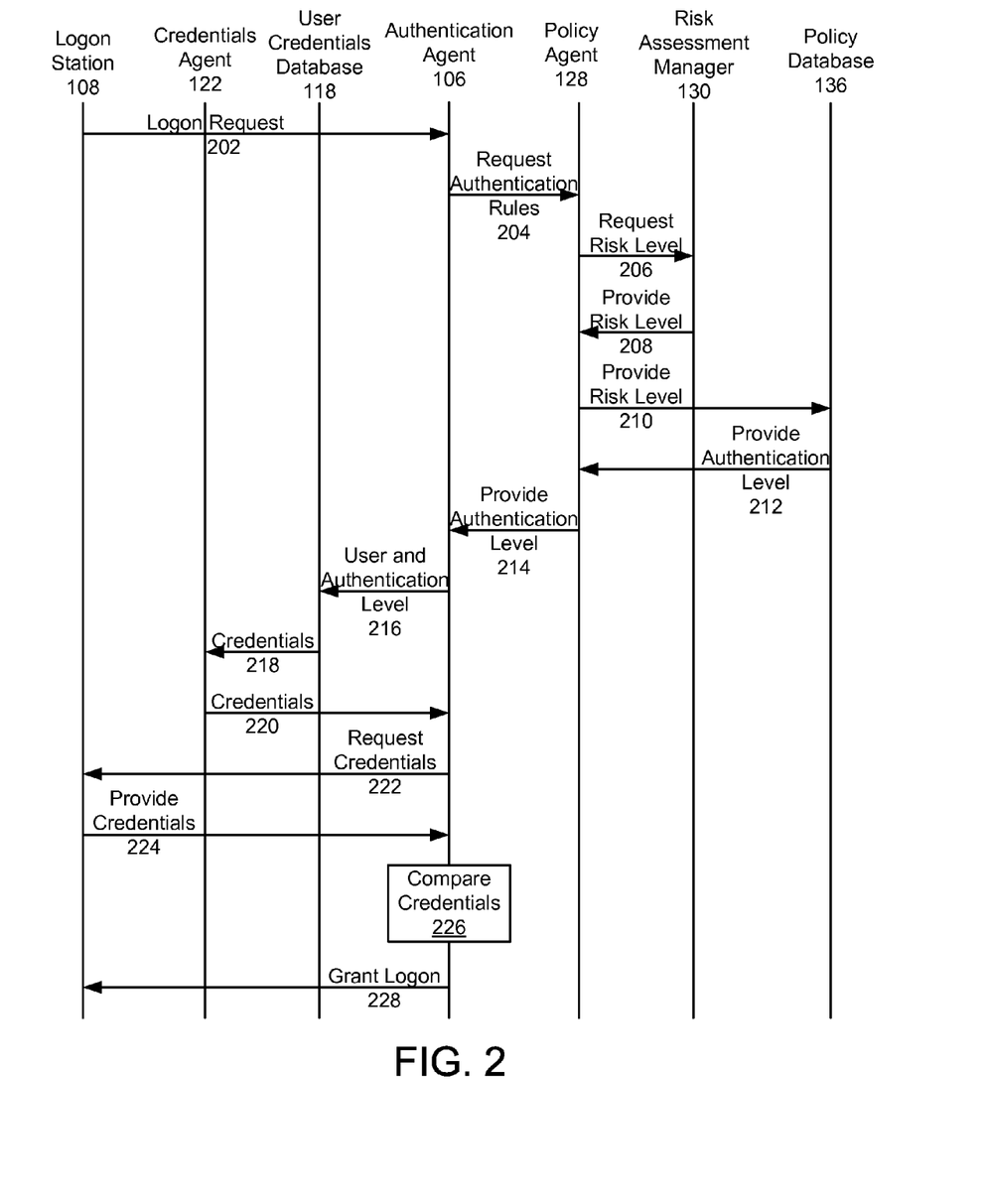
FIG. 2 is a vertical-time sequence diagram showing messages exchanged in the system of FIG. 1 according to an example embodiment.

FIG. 2 is a vertical time-sequence diagram showing messages exchanged in the system of FIG. 1 according to an example embodiment. The processes described with reference to FIG. 2 are merely exemplary. The processes may be used for different logon attempts by a user and may have the same or different risk levels and correspondingly same or different authentication requirements and credentials based on the risk levels.

In the example shown in FIG. 2, the logon interface 110 of the authentication agent 106 may receive a logon request 202 from the user via the logon station 108. The logon request 202 may include an attempt to logon which may include, for example, the name, identity, or handle of the user. Or, the logon interface 110 of the authentication agent 106 may receive the identity of the user after the initial logon request. However, if the logon interface 110 of the authentication agent 106 receives the identity of the user as part of a two- or three-step process, the identity may still be considered to be included in the logon request 202, according to an example embodiment.

The logon interface 110 of the authentication agent 106 may respond to the logon request 202 by providing a request for authentication rules 204, risk level, and/or authentication level to the policy agent 128. The request for authentication rules 204 may be a request for the level of authentication which the authentication agent 106 should require from the user, such as which authentication factor(s) or technique(s). The request for authentication rules 204 may include whether to require the user to provide, for example, a password, information stored on an electronic device, and/or biometric information.

The policy agent 128 may respond to receiving the request for authentication rules 204 by requesting a risk level 206 from the risk assessment manager 130. The request for the risk level 206 may include the identity of the user, or may be based only on the general risk to the system 100 or network of which the system 100 is a member.

The risk assessment manager 130 may determine the risk level of the user or system 100, such as by checking the user table 134 and/or the risk factor module 132 applying the risk factor rules to the data indicating risk factors and/or time-varying context factors. Based on the determination of the risk level, the risk assessment manager 130 may provide the risk level 208 to the policy agent 128. The policy agent 128 may respond to receiving the provided risk level 208 from the risk assessment manager 130 by providing the risk level 210 to the policy database 136.

The policy database 136 may check the risk level against the policy table 138 to determine the required authentication level, technique(s), or factor(s) to grant the logon request based on the provided risk level. The authentication level, technique(s), or factor(s) for the given risk level may be stored, for example, in the policy table 138 (such as Table 2 shown above) or other database, and the policy database 136 may retrieve the authentication level based on the provided risk level 210. The policy database 136 may then provide the authentication level 212, authentication technique(s), or authentication factor(s) to the policy agent 128. After the policy agent 128 has received the provided authentication level 212, authentication technique(s), or authentication factor(s), the policy agent 128 may provide the authentication level 214 to the authentication agent 106.

Upon receiving the authentication level from the policy agent 128, the credentials requester 112 of the authentication agent 106 may provide the user and required authentication level 216, authentication technique(s), or authentication factor(s) to the user credentials database 118. The user credentials database 118 may check the user identity and the authentication level, authentication technique(s), or authentication factor(s) against the credentials table 120 to determine the information which should satisfy the required authentication level, authentication technique(s), or authentication factor(s) to allow the user to log on to the system 100.

The user credentials database 118 may send the credentials 218 to the credentials reader 124 of the credentials agent 122. The credentials reader 124 of the credentials agent 122 may receive the credentials 218 from the user credentials database 118 and provide the credentials 220 to the credentials receiver 114 of the authentication agent 106. At this point, the authentication agent 106 may know and/or have determined what credentials will be required for the user to logon to the system 100, based on the provided authentication level 214, authentication technique(s), or authentication factor(s) received from the policy agent 128.

The logon interface 110 of the authentication agent 106 may then request credentials 222 from the user via the logon station 108. The logon interface 110 of the authentication agent 106 may, for example, require a password, information stored on an electronic device, and/or biometric information from the user. This information and/or required credentials may be different for different logon attempts. For example, in a first logon attempt by the user in which the policy agent 128 determined that the user's risk level was low, the authentication agent 106 may require the user to provide only one authentication technique or factor. In a second logon attempt by the user, in which the policy agent 128 determined that the risk level for the user was higher than in the first logon attempt, the authentication agent 106 may require more than one authentication technique or factor, such as two, three, or even four authentication factors. For example, in the second logon attempt, the authentication agent 106 may require the user to provide a password, as well as information read from or stored on an electronic device, and/or biometric information. The credentials may all be requested at once, or some of the credentials may be requested only after determining the risk level. For example, the authentication agent 106 may request the username and password before determining the risk level, and request additional authentication techniques or factors after determining the risk level associated with the user.

In response to receiving the request for credentials 222, the user may provide the credentials 224 to the logon interface 110 of the authentication agent 106 via the logon station 108. The user may, for example, provide the password, pass phrase or PIN as well as the number or value read from an OTP token, smart card, RFID card or mobile phone, and/or fingerprint, face, or iris information to the authentication agent 106.

The comparator 116 of the authentication agent 106 may compare the credentials provided by the user (226). The comparator 116 of the authentication agent 106 may, for example, compare the credentials 224 provided by the user via the logon station 108 to the credentials 220 provided by the credentials agent 122. If the credentials 224 provided by the user do not match the credentials provided by the credentials agent 122, the authentication agent 106 may deny the logon request 202. If the credentials provided by the user match the credentials provided by the credentials agent 122, then the authentication agent 106 may grant the logon request 228. The user may thereby have access to the system 100 and/or other information within a network which includes the system 100, according to an example embodiment.

In an example embodiment, the above methods and/or processes may be used to authenticate a user requesting to access a document. For example, a user, who may or may not have been required to logon to a system, may request to access a specified document. The document may be any sort of electronic document, such as a word processing document, a spreadsheet, a presentation (such as PowerPoint) document, a portable document format (pdf) document, or image document, as non-limiting examples. The system 100 may determine and/or store risk levels and/or authentication levels association with the document. The risk levels and/or authentication levels may be the same for all users, or may be different for different users. For example, the policy module 104 of the system 100 may receive data indicating risk factors associated with the specified document and/or users of the system 100, and update risk levels and/or authentication levels for the specified document and/or users by applying the data to risk factor rules.

The authentication module 102 may request a risk level and/or authentication level from the policy module 104. The authentication module 102 may request the risk level and/or authentication level based on a user requesting access to the specified document, and/or based on the document being flagged as requiring authentication to access. The policy module 104 may provide the risk levels and/or authentication levels to the authentication module 102 based only on the specified document, or based on both the specified document and the user.

Figure 3:
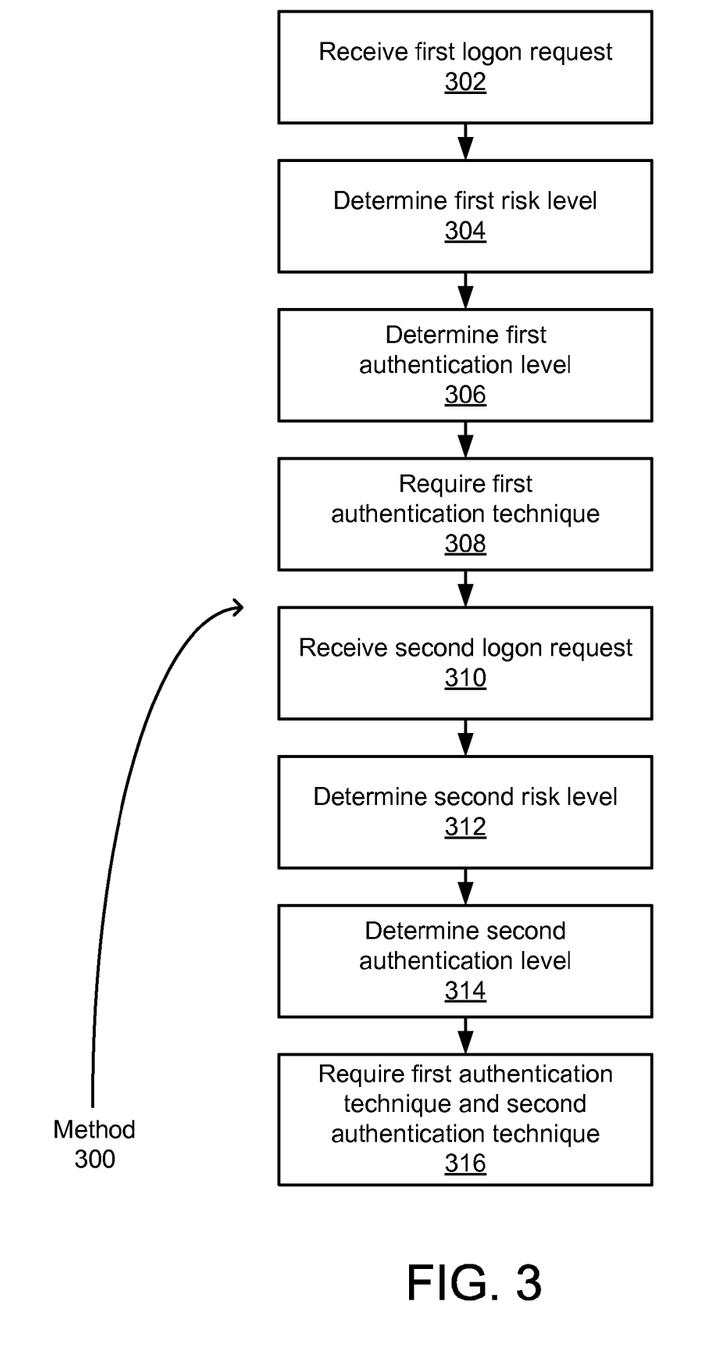
FIG. 3 is a flowchart of a method according to an example embodiment.

FIG. 3 is a flowchart of a method 300 according to an example embodiment. In this example, the method 300 may include receiving, by a computing device, a first logon request from a user for a first session (302); determining a first risk level associated with the user a context of the first logon request based on a plurality of received context factors (304); determining a first required authentication level for the user based on the first determined risk level (306); requiring the user to present a first authentication technique to logon based on the first determined required authentication level (308); receiving a second logon request from the user for a second session (310); determining a second risk level associated with a context of the second logon request based on a plurality of updated received context factors (312); determining a second required authentication level for the user based on the second determined risk level (314); and requiring the user to present the first authentication technique and a second authentication technique to logon based on the second determined required authentication level, each of the first authentication technique and the second authentication technique being independently sufficient to authenticate the user based on a lower risk level (316).

In an example embodiment, the second risk level may be higher than the first risk level.

In an example embodiment, the first logon request and the second logon request may each include an identification of the user.

In an example embodiment, the first logon request and the second logon request may each include an identification of the user, and the context of the first logon request and the context of the second logon request may be based at least in part on the identity of the user.

In an example embodiment, the updated received context factors may include previous activity associated with the user.

In an example embodiment, the updated received context factors may include previous failed logon attempts by the user.

In an example embodiment, the updated received context factors may include a pattern of financial activity by the user.

In an example embodiment, the updated received context factors may include previous security attacks on a network which includes the computing device.

In an example embodiment, the updated received context factors may include a location from which the user requested the second logon.

In an example embodiment, the first authentication technique may include information known to the user and the second authentication technique may include information stored on an electronic security device.

In an example embodiment, the first authentication technique may include information known to the user and the second authentication factor may include biometric information associated with the user.

In an example embodiment, the first authentication technique may include information known to the user and the second authentication technique may include data associated with an electronic device via which the computing device received the second logon request from the user.

In an example embodiment, the method 300 may further include requiring the user to present the first authentication technique, the second authentication technique, and a third authentication technique to logon based on the second determined required authentication level, and the first authentication technique may include information known to the user, the second authentication technique may include information presented to the user by an electronic security device, and the third authentication technique may include biometric information associated with the user.

Figure 4:
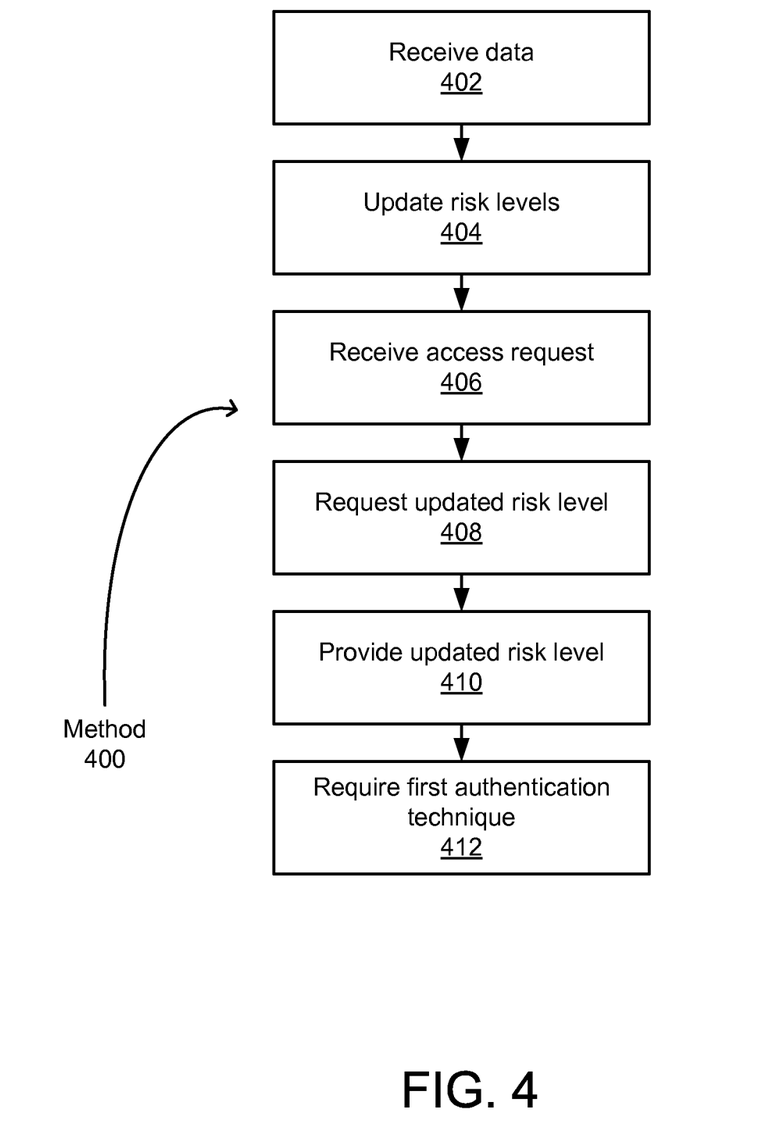
FIG. 4 is a flowchart of a method according to another example embodiment.

FIG. 4 is a flowchart showing a method 400 according to another example embodiment. In this example, the method 400 may include a policy module 104 receiving data 140 indicating risk factors associated with users (402); the policy module 104 updating risk levels for the users by applying the data to risk factor rules (404); an authentication module 102 receiving a first access or logon request from a user (406); the authentication module 102 requesting a first updated risk and/or authentication level for the user from the policy module 104 in response to receiving the first access or logon request (408); the policy module 104 providing the updated risk levels and/or authentication levels associated with the updated risk levels to the authentication module 102 in response to receiving the request from the authentication module (410); and the authentication module 102 requiring the user to provide a first authentication technique to grant the first access or logon request based on the first updated risk and/or authentication level received from the policy module (412).

In an example embodiment, the data 140 indicating risk factors may include previous activity associated with the user.

In an example embodiment, the method 400 may further include the authentication module 102 receiving a second logon request from the user; the authentication module 102 requesting a second updated risk and/or authentication level for the user from the policy module 104 in response to receiving the second logon request; and the authentication module 102 requiring the user to provide at least a second authentication technique to grant the second logon request based on the second updated risk and/or authentication level, the first authentication technique and the second authentication technique each being independently sufficient to authenticate the user for a lower risk level.

In an example embodiment, the first authentication technique may include requiring the user to answer a question and the second authentication technique may include requiring the user to provide information stored on an electronic security device.

In an example embodiment, the first authentication technique may include requiring the user to answer a question and the second authentication technique may include receiving biometric information from the user.

In an example embodiment, the first authentication technique may include requiring the user to answer a question and the second authentication technique may include confirming an address of a computing device via which the user is requesting to logon.

In an example embodiment, the method 400 may further include the authentication module receiving a second logon request from the user; requesting a second updated risk and/or authentication level for the user from the policy module 104 in response to receiving the second logon request; and requiring the user to provide at least the first authentication technique and a second authentication technique to grant the second logon request based on the second updated risk and/or authentication level, the first authentication technique and the second authentication technique each being independently sufficient to authenticate the user for a lower risk level.

Figure 5:
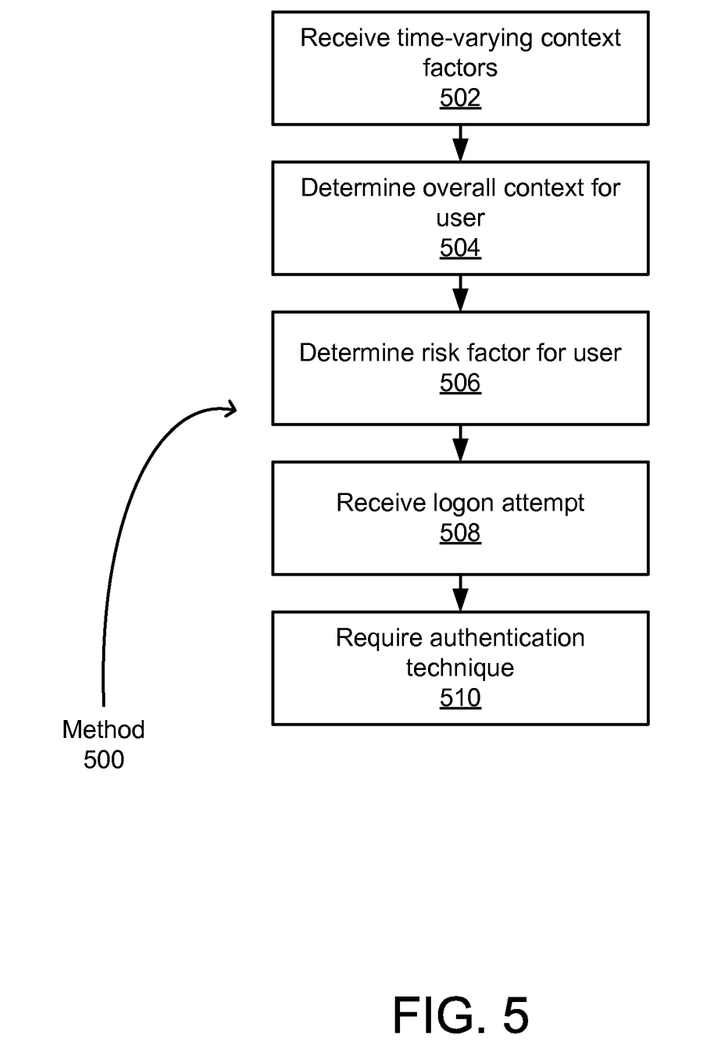
FIG. 5 is a flowchart of a method according to another example embodiment.

FIG. 5 is a flowchart showing a method 500 according to another example embodiment. In this example, the method 500 may include a computing device receiving a plurality of time-varying context factors (502); determining an overall context for at least one user based on the plurality of time-varying risk factors (504); determining a risk level for the at least one user based on the overall context (506); receiving a first logon attempt from the at least one user (508); and requiring the user to present at least a first authentication technique to grant the first logon based on the determined risk level (510).

In an example embodiment, the method 500 may further include receiving updated time-varying context factors; determining an updated overall context for the at least one user based on the updated time-varying context factors; determining an updated risk level for the user based on the updated overall context; receiving a second logon attempt from the at least one user; and requiring the user to present at least a second authentication technique to grant the second logon based on the determined risk level, each of the first authentication technique and the second authentication technique being independently sufficient to authenticate the user for a lower risk level.

In an example embodiment, the requiring the user to present at least the first authentication technique may include requiring the user to present at least the first authentication technique and a second authentication technique to grant the second logon based on the determined risk level.

Figure 6:
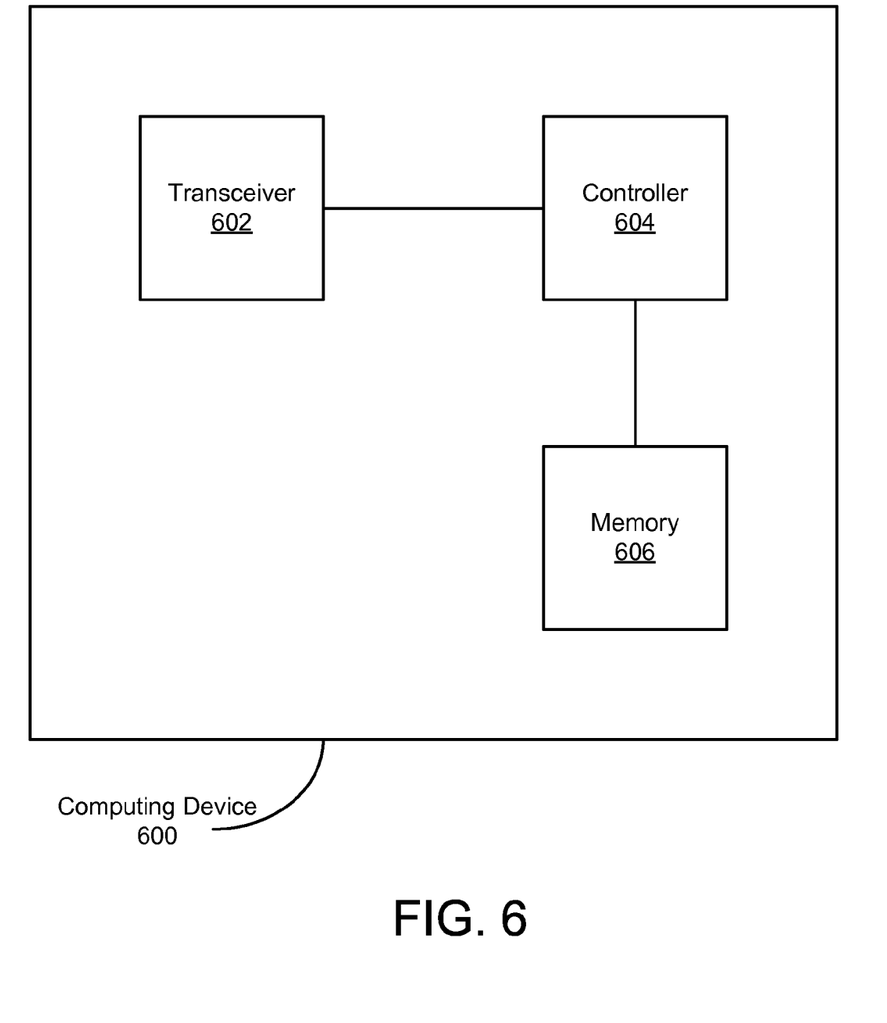
FIG. 6 is a block diagram of a computing device according to an example embodiment.

FIG. 6 is a block diagram of a computing device 600 according to an example embodiment. The computing device 600 (e.g. a server, SoC, or ASIC) may include, for example, a transceiver (or input/output interface) 602, including an output node to provide output to the user and/or other computing devices, and an input node to receive input from the user and/or other computing devices, a controller 604 or processor to control operation of the computing device 600 and execute instructions or software, and a memory 606 to store data and/or instructions. Controller 604 may also make decisions or determinations, generate frames or messages for transmission, decode received frames or messages for further processing, and other tasks or functions described herein.

Controller 604 may be programmable and capable of executing software or other instructions stored in memory 606 or on other computer media to perform the various tasks and functions described above, such as one or more of the tasks or methods described above.

In addition, a storage medium or memory 606 may be provided that includes stored instructions, which when executed by a controller or processor may result in the controller 604, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A system comprising:
at least one processor and at least one memory comprising:
a policy module configured to:
receive data indicating risk factors associated with the system;
update risk levels and/or authentication levels for the system, independent of received requests, by applying the data to risk factor rules; and
provide the updated risk levels and/or authentication levels associated with the updated risk levels to an authentication module in response to receiving requests from the authentication module; and
the authentication module configured to:
receive a first logon request, the first logon request not including an identification of a user;
in response to receiving the first logon request, request a first updated risk level and/or authentication level for the system from the policy module;
require a first authentication technique to grant the first logon request without the identification of the user based on the first updated risk level and/or authentication level received from the policy module;
if the first authentication technique matches credentials stored by the authentication module, grant the logon request;
if the first authentication technique does not match the credentials stored by the authentication module, deny the logon request;
receive a second logon request, the second logon request not including an identification of the user;
in response to receiving the second logon request, request a second updated risk and/or authentication level for the system from the policy module; and
require at least a second authentication technique to grant the second logon request based on the second updated risk and/or authentication level, the first authentication technique and the second authentication technique each being independently sufficient for authentication for a determined risk level.

2. The system of claim 1, wherein the data indicating risk factors include previous failed logon attempts to the system.

3. The system of claim 1, wherein the first authentication technique includes requiring an answer to a question and the second authentication technique includes requiring information stored on an electronic security device.

4. The system of claim 1, wherein the first authentication technique includes requiring an answer to a question and the second authentication technique includes receiving biometric information.

5. The system of claim 1, wherein the first authentication technique includes requiring an answer to a question and the second authentication technique includes confirming an address of a computing device from which the logon request is received.

6. The system of claim 1, wherein the authentication module is further configured to:
receive a second logon request, the second logon request not including an identification of a user;
in response to receiving the second logon request, request a second updated risk and/or authentication level for the system from the policy module; and
require at least the first authentication technique and a second authentication technique to grant the second logon request based on the second updated risk and/or authentication level, the first authentication technique and the second authentication technique each being independently sufficient to authenticate the system for a lower risk level.

7. The system of claim 6, wherein the second updated risk and/or authentication level is higher than the first updated risk and/or authentication level.

8. The system of claim 1, wherein the policy module comprises:
a risk assessment manager comprising:
a user table configured to:
receive the data;
store identities of users and the data associated with the users;
provide the data to a risk factor module;
receive the updated risk levels for the users from the risk factor module; and
provide the updated risk levels upon request from a policy agent; and
the risk factor module configured to:
receive the data from the user table;
determine the updated risk levels by applying the data to risk factor rules; and
provide the updated risk levels to the user table;
a policy agent configured to:
receive an authentication level request from the authentication module;
in response to receiving the authentication level request, request the updated risk level for the system from the risk assessment manager;
receive the updated risk level for the system from the risk assessment manager;
provide the updated risk level to a policy database;
receive the first authentication technique from the policy database; and
provide the first authentication technique to the authentication module; and
the policy database configured to:
receive the updated risk level from the policy agent;
determine that the first authentication technique should be required based on the updated risk level; and
provide the first authentication technique to the policy agent.

9. The system of claim 1, wherein the logon request indicates that an unknown user desires to logon.

10. A non-transitory, computer-readable storage medium comprising computer executable code stored thereon that, when executed, is configured to cause a computing system to:
receive data indicating risk factors associated with the computing system;
update risk levels for the computing system at least partially independent of logon requests by applying the data to risk factor rules;
receive a first logon request, the first logon request not including an identification of a user;
require a first authentication technique to grant the first logon request without the identification of the user based on a first updated risk level for the computing system;
if the first authentication technique matches stored credentials, grant the logon request;
if the first authentication technique does not match the stored credentials, deny the logon request;
receive a second logon request, the second logon request not including an identification of the user; and
require at least a second authentication technique to grant the second logon request based on a second updated risk level, the first authentication technique and the second authentication technique each being independently sufficient to authenticate the first logon request for a determined risk level.

11. The storage medium of claim 10, wherein the data indicating risk factors include previous failed logon attempts.

12. The storage medium of claim 10, wherein the first authentication technique includes requiring an answer to a question and the second authentication technique includes requiring information stored on an electronic security device.

13. The storage medium of claim 10, further configured to cause the computing system to:
receive a second logon request, the second logon request not including an identification of a user; and
require at least the first authentication technique and a second authentication technique to grant the second logon request based on a second updated risk level, the first authentication technique and the second authentication technique each being independently sufficient to authenticate the first logon request for a lower risk level.

14. The storage medium of claim 13, wherein the second updated risk level is higher than the first updated risk level.

15. A method comprising:
receiving, by a computing device, data indicating risk factors associated with a computing system;
updating at least one risk level for the computing system by applying the data to risk factor rules;
receiving a first logon request to the computing system, the first logon request not including an identification of a user;
determining a first authentication technique of a plurality of authentication techniques based at least on a first updated risk level for the computing system, the plurality of authentication techniques comprising the first authentication technique and a second authentication technique that are each independently sufficient to authenticate the first logon request for the first updated risk level;
requiring the first authentication technique to grant the first logon request without the identification of the user;
if the first authentication technique matches stored credentials, granting the logon request;
if the first authentication technique does not match the stored credentials, denying the logon request;
receiving a second logon request, the second logon request not including an identification of the user; and
requiring at least the second authentication technique to grant the second logon request based at least on a second updated risk level.

16. The method of claim 15, wherein the first updated risk level is lower than the at least one risk level.

* * * * *